US011232455B2

(12) United States Patent
Hammad

(10) Patent No.: US 11,232,455 B2
(45) Date of Patent: *Jan. 25, 2022

(54) SYSTEM AND METHOD INCLUDING CUSTOMIZED LINKAGE RULES IN PAYMENT TRANSACTIONS

(71) Applicant: Visa International Service Association, San Francisco, CA (US)

(72) Inventor: Ayman Hammad, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/550,575

(22) Filed: Aug. 26, 2019

(65) Prior Publication Data

US 2019/0378138 A1    Dec. 12, 2019

Related U.S. Application Data

(63) Continuation of application No. 13/038,268, filed on Mar. 1, 2011, now Pat. No. 10,430,794.

(60) Provisional application No. 61/312,196, filed on Mar. 9, 2010.

(51) Int. Cl.
*G06Q 40/00* (2012.01)
*G06Q 20/40* (2012.01)

(52) U.S. Cl.
CPC ......... *G06Q 20/405* (2013.01); *G06Q 20/40* (2013.01); *G06Q 20/401* (2013.01)

(58) Field of Classification Search
USPC ..................................................... 705/35–45
See application file for complete search history.

(56) References Cited

U.S. PATENT DOCUMENTS

| 5,724,423 A | 3/1998 | Khello |
| 6,609,113 B1 | 8/2003 | O'Leary et al. |
| 7,584,153 B2 | 9/2009 | Brown et al. |

(Continued)

FOREIGN PATENT DOCUMENTS

| KR | 10-2007-0021826 A | 2/2007 |
| WO | 2003-090027 A2 | 10/2003 |

(Continued)

OTHER PUBLICATIONS

International Search Report and Written Opinion dated Oct. 19, 2011 in Int'l Patent Application No. PCT/US2011/026740, 16 pages.

(Continued)

*Primary Examiner* — Chia-Yi Liu
(74) *Attorney, Agent, or Firm* — Kilpatrick Townsend & Stockton LLP

(57) ABSTRACT

Systems and methods for generating a dynamic verification value for electronic payment transactions are disclosed. A user of a portable consumer device enrolls the account identifier associated with the portable consumer device and specifies one or more customized linkage rules that identify one or more user communication devices and user identifiers that should be used to submit an authentication request message to an entity that generates a dynamic verification value. A server computer that receives an authentication request message determines whether the authentication request message complies with the specified customized linkage rules and generates a dynamic verification value.

20 Claims, 7 Drawing Sheets

(56) References Cited

U.S. PATENT DOCUMENTS

| | | |
|---|---|---|
| 7,720,756 B2 | 5/2010 | Kavounas |
| 7,761,374 B2 | 7/2010 | Sahota et al. |
| 7,810,165 B2 | 10/2010 | Hammad et al. |
| 7,877,325 B2 | 1/2011 | Bishop et al. |
| 7,899,744 B2 | 3/2011 | Bishop et al. |
| 8,121,945 B2 | 2/2012 | Rackley et al. |
| 8,365,594 B2 | 2/2013 | Sabini et al. |
| 2003/0126094 A1 | 7/2003 | Fisher et al. |
| 2004/0073688 A1 | 4/2004 | Sampson |
| 2005/0043997 A1 | 2/2005 | Jagdeep et al. |
| 2006/0229978 A1 | 10/2006 | Popovic et al. |
| 2007/0294182 A1 | 12/2007 | Hammad et al. |
| 2008/0029593 A1 | 2/2008 | Hammad et al. |
| 2008/0034221 A1 | 2/2008 | Hammad et al. |
| 2008/0040276 A1 | 2/2008 | Hammad et al. |
| 2008/0054079 A1 | 3/2008 | Mullen |
| 2008/0065555 A1 | 3/2008 | Mullen |
| 2008/0288405 A1 | 11/2008 | John |
| 2009/0106148 A1 | 4/2009 | Prada |
| 2009/0150269 A1 | 6/2009 | Bishop et al. |
| 2009/0210712 A1 | 8/2009 | Fort |
| 2009/0255987 A1 | 10/2009 | Olivares Baena |
| 2009/0271211 A1 | 10/2009 | Hammad |
| 2009/0313168 A1 | 12/2009 | Manessis |
| 2009/0319430 A1 | 12/2009 | Faith et al. |
| 2009/0319784 A1 | 12/2009 | Faith et al. |
| 2010/0027786 A1 | 2/2010 | Faith et al. |
| 2010/0088752 A1 | 4/2010 | Nagulakonda et al. |
| 2010/0121767 A1 | 5/2010 | Coulter et al. |
| 2010/0133335 A1 | 6/2010 | Maguid et al. |
| 2010/0293382 A1 | 11/2010 | Hammad |
| 2010/0299267 A1 | 11/2010 | Faith et al. |
| 2010/0318783 A1 | 12/2010 | Raj et al. |
| 2011/0225089 A1 | 9/2011 | Hammad |
| 2011/0225094 A1 | 9/2011 | Hammad |

FOREIGN PATENT DOCUMENTS

| | | |
|---|---|---|
| WO | 2008-027642 A2 | 3/2008 |
| WO | 2011-112393 A2 | 9/2011 |
| WO | 2011-112394 A2 | 9/2011 |
| WO | 2011-112396 A2 | 9/2011 |

OTHER PUBLICATIONS

International Search Report and Written Opinion dated Nov. 14, 2011 in Int'l Patent Application No. PCT/US2011/026747, 14 pages.

International Search Report and Written Opinion dated Nov. 15, 2011 in Int'l Patent Application No. PCT/US2011/026757, 14 pages.

|  | Primary Account Number (PAN) | Verification Token | User Computer | Specific Identifier |
|---|---|---|---|---|
| 401A | X | X | X | X |
| 402A | X | X | X |  |
| 403A | X | X |  |  |
| 404A | X |  | X |  |
| 405A | X |  | X | X |
| 406A |  | X | X | X |
| 407A |  | X | X |  |
| 408A | X | X |  | X |

*Table A*

|  | Primary Account Number (PAN) | Verification Token | Mobile Device | Specific Identifier |
|---|---|---|---|---|
| 401B | X | X | X | X |
| 402B | X | X | X |  |
| 404B | X |  | X |  |
| 405B | X |  | X | X |
| 406B |  | X | X | X |
| 407B |  | X | X |  |

*Table B*

*FIG. 4*

| Account | link to specific verification token | link to specific computer(s) |
|---|---|---|
| Account 501 | N/A | N/A |
| Account 502 | N/A | User Computer 507 |
| Account 503 | Verification device 506 | User computer 507 (If amount > $500.00) |
| Account 504 | Verification device 505 | User computer 507 or User computer 508 |

*Table A*

| Token | link to specific computer(s) |
|---|---|
| Verification token 506 | User computer 508 |

*Table B*

SYSTEM AND METHOD INCLUDING CUSTOMIZED LINKAGE RULES IN PAYMENT TRANSACTIONS

CROSS-REFERENCES TO RELATED APPLICATIONS

This is a continuation application of U.S. patent application Ser. No. 13/038,268 filed Mar. 1, 2011, which is a non-provisional application and claims priority from the provisional patent application No. 61/312,196, filed on Mar. 9, 2010, which are incorporated herein by reference in their entirety for all purposes.

BACKGROUND

There is a need for more secure data transfer when paying for goods and services using payment cards such as debit and credit cards.

In a typical payment transaction, a user may use a credit card to purchase an item at a merchant or enter his account information into a payment page of a merchant's website. The merchant then generates an authorization request message using a POS (point of sale) terminal when the user is present at the merchant location. Alternatively, for an online transaction, the merchant website may generate an authorization request message for card-not-present (CNP) transactions. In either instance, the authorization request message is passed to the issuer of the credit card, and the issuer may approve or deny the request to authorize the transaction.

There are a variety of methods by which fraudsters attempt to obtain account information of users for conducting fraudulent transactions. To address this problem, there is a need for making electronic payment transactions partially dependent on devices that are known to be in the possession of the user (account holder) of the credit or debit card.

Embodiments of the invention address these and other problems, individually and collectively.

BRIEF SUMMARY

Embodiments of the invention disclosed herein include systems and methods for generating dynamic verification values for use in the electronic payment transactions.

One embodiment of the invention is directed to receiving an authentication request message including a verification token identifier associated with a verification token, a user communication device identifier associated with a communication device, and an account identifier associated with a portable consumer device; and analyzing the verification token identifier, the user communication device identifier, and the account identifier in the authentication request message to determine if a user using the verification token, the user communication device and the portable consumer device is an authentic user.

Another embodiment of the invention is directed to determining whether the account identifier associated with the portable consumer device is associated with one or more customized linkage rules, and determining whether the authentication request message complies with the one or more customized linkage rules.

Another embodiment of the invention is directed to prompting a user to provide a user identifier if the customized linkage rules indicate that the user identifier is required from the user. The user identifiers include any one of a voice signature of the user, fingerprint of the user or a password.

Another embodiment of the invention is directed to generating a dynamic verification value if the authentication request message complies with the one or more customized linkage rules, and sending the dynamic verification value to the verification token, and to a server computer in communication with a payment processing network.

Another embodiment of the invention is directed to an enrollment process where an account identifier is received from a user, and the user is provided with one or more customized linkage options. The user then identifies one or more customized linkage rules from the customized linkage options. The user communication devices and/or verification tokens identified in the customized linkage rules are registered and the account identifier is associated with the customized linkage rules.

These and other embodiments of the invention are described in further detail below.

BRIEF DESCRIPTION OF THE DRAWINGS

FIG. 4 shows two tables that show some possible customized linkage rules.

DETAILED DESCRIPTION

Figure 1:
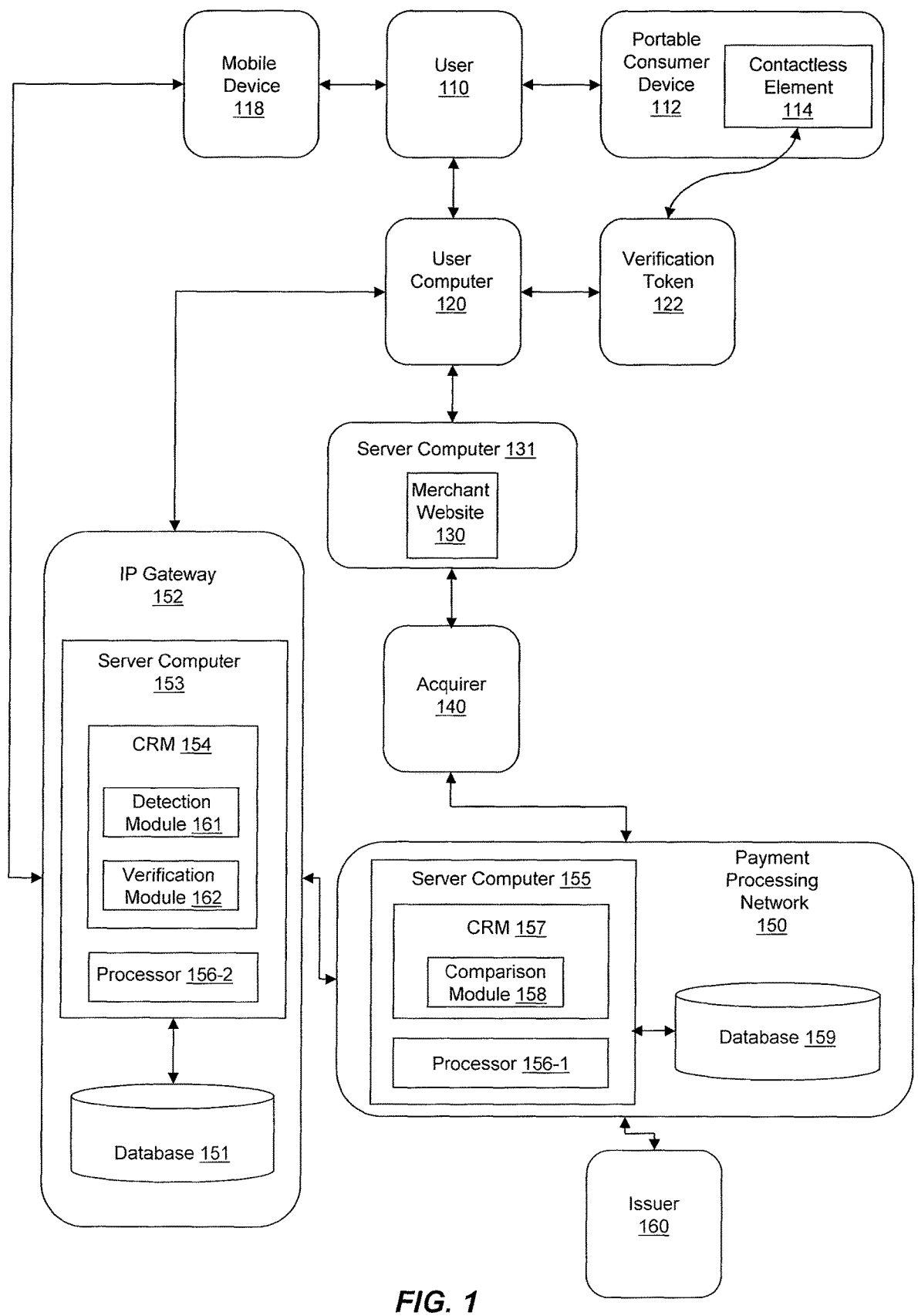
FIG. 1 shows a system according to an embodiment of the invention.

In order to provide more security for electronic payment transactions, a portable consumer device (e.g. credit and debit card), a verification token and one or more user communication devices (e.g. a user computer) that are known to be owned and/or used by the user for performing electronic payment transactions may be identified by the user to be linked together in a variety of combinations and under a variety of conditions. Thereafter, a payment transaction that originates from the specified combination of the verification token, portable consumer device and one or more user communication devices is determined to be authentic and originated from an authorized source. In contrast, a payment transaction that that originates without the presence of the identified combination of the portable consumer device, verification token and one or more user communication devices may be determined not to be authentic.

Embodiments of the invention disclosed herein include systems and methods for linking portable consumer devices (e.g. a credit/debit card), user communication devices (e.g. a laptop computer), verification tokens, and user specific identifiers (e.g. fingerprint, password, user voice signature, etc.) and establishing one or more customized linkage rules associated with an account identifier associated with the portable consumer device.

Definitions

Account identifier—As used herein, "account identifier" refers to a means of identifying a financial account associated with a consumer (i.e. user) using which the consumer engages in financial activity. For example, an account identifier may be a Primary Account Number (PAN) of a credit and/or debit card. The Primary Account Number (PAN) may include numbers and/or letters and may be in any length. Other examples of account identifier may include a username, an alphanumeric or numeric record locator, and a digital file including data that can be used to identify an account.

Authorization request message—As used herein, an "authorization request message" may be a message that includes an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. In embodiments of the invention, an authorization request message may include, among other data, an account identifier, one or more account attributes, an amount of the transaction (which may be any type and form of a medium of exchange such a money or points), and identification of a merchant (e.g., a merchant verification value or a merchant ID). Typically, an authorization request message is generated by a server computer (if the transaction is an e-commerce transaction) or a Point of Sale (POS) device (if the transaction is a brick and mortar type transaction) and is sent to an issuer via a payment processing network and an acquirer.

User communication device—As used herein, "user communication device" can refer to an electronic device capable of communication with other electronic devices. For example, user communication device may be a desktop computer, laptop computer, netbook computer, tablet computer (e.g. iPad), mobile phone, verification token (described in detail later) and any other electronic device that can be coupled to another electronic device either wirelessly or via a direct connection.

Dynamic verification value—As used herein "dynamic verification value" (e.g., a dynamic device verification value, a dynamic card verification value, and a dCVV2 value) can refer to a value that can be used to verify that a transaction (and in some cases a portable consumer device used to conduct a transaction) is authentic. It may be a numeric or alpha-numeric value that is generated by an algorithm (e.g. encryption algorithm) that uses account data such as account identifier and account attribute as inputs.

Authentication request message—As used herein, "authentication request message" refers to one or more data strings including data about the devices being utilized to request for a dynamic verification value from a verification entity. The Authentication request message is generated by a verification token or a user communication device and is sent to a server computer in the verification entity. The data in the authentication request message allows the verification entity to identify the verification token and/or user communication devices and may also include an account identifier of the portable consumer deice. For example, the data in the authenticating request message may be a serial number associated with the verification token and the user communication devices (e.g. user computer and mobile device).

User identifier—As used herein, "user identifier" refers to a form of identification that is unique to the user. The user identifier may be or include biometric characteristics of the user such as fingerprint, voice signature, etc. The user identifier may also be in the form of an alphanumeric or numeric password and/or personal identification number and it may be in any length.

Embodiments of the invention disclosed herein also include systems and methods for utilizing such linkage rules to verify that the transaction originates from an authorized source. Embodiments of the invention can also verify that the user of the portable consumer device (e.g., debit or credit card) used to conduct the transaction is an authentic user.

In the embodiments of the invention, a portable consumer device may be tied to a particular user communication device. Also, it is possible to restrict the use of one or more user communication devices with multiple pre-designated portable consumer devices, or restrict the use of one portable consumer device with multiple pre-designated user communication devices.

For example, a credit card may be tied to a laptop computer. Thereafter the payment transaction related to Internet purchases must originate from the laptop computer tied to the credit card of the user. Also, the credit card may be tied to more than one computer (i.e. home computer and work computer).

Customized linkage rules for portable consumer devices, verification tokens and user communication devices may be specified by the issuer of the portable consumer device and the payment processing network instead of, or in addition to the user. In some embodiments, a user may link one portable consumer device to one or more user communication devices (or vise versa) during an enrollment process. The issuer may also provide a mechanism (such as website) for users to enroll and to change their customized linkage rules for the portable consumer device, verification token and user communication devices at any given time. In some embodiments, an issuer may want to impose a restriction on the use of a particular verification token and/or portable consumer device with a particular user communication device.

In the embodiments of the invention, payment transactions may utilize a dynamic verification value (such as a dCVV2 or a "dynamic card verification value"). The customized linkage rules may serve as a prerequisite for requesting a dynamic verification value. In such embodiments, an authentication request message may be sent from the verification token or a user communication device (e.g. mobile device), through a secure network, to a verification entity. Thereafter, the specified customized linkage rules may be checked by the verification entity to determine if the proper combination of the portable consumer device, verification token and one or more user communication devices were used in submitting an authentication request message. Upon confirmation, a dynamic verification value is generated and sent to the verification token or the user communication device.

The dynamic verification value may then be included in an authorization request message for performing an electronic payment transaction. The dynamic verification value may be sent to a server computer (associated with a payment processing network), which may use the dynamic verification value for authentication of the portable consumer device used by a user to perform the electronic payment transaction. Further details regarding this process flow, can be found in U.S. patent application Ser. No. 12/712,148, filed on Feb. 24, 2010, U.S. Provisional Application No. 61/258,194, filed on Nov. 4, 2009, and U.S. Provisional Application No. 61/241,367, filed on Sep. 10, 2009 which are herein incorporated by reference in their entirety for all purposes.

Embodiments of the present invention are able to maintain or improve existing user experiences, minimize the impact on merchant processes/systems, leverage existing network data transport mechanisms, utilize existing issuer validation infrastructure, support multiple forms of implementation, and maintain consistency with broader authentication strategy.

I. System

FIG. 1 shows a block diagram illustrating the components of a system according to one embodiment. FIG. 1 shows a user 110, a portable consumer device 112, a mobile device 118, a user computer 120, a verification token 122, a merchant website 130, an acquirer 140, a payment processing network 150, an IP Gateway 152, server computers 153 and 155, computer readable media 154 and 157, data processors 156-1 and 156-2, a comparison module 158, a database 159, an issuer 160, a detection module 161, and a verification module 162.

The user 110 can use the portable consumer device 112, the mobile device 118, and the user computer 120. The user 110 interacts with the merchant website 130 using the user computer 120. The mobile device 118, the verification token 122 and the user computer 120 are capable of communicating with the IP Gateway 152 for submitting an authentication request message, and requesting and receiving a dynamic verification value (this process will be described in detail later). The merchant website 130 is in communication with the acquirer 140. The acquirer 140 is in communication with the issuer 160 through the payment processing network 150. The payment processing network 150 is in communication with the IP Gateway 152. The IP Gateway has access to the database 151, the IP Gateway server computer 153 which includes a computer readable medium 154, the processor 156-2, the detection module 161 and the verification module 162. The IP Gateway server computer 153 is in communication with the database 151. The payment processing network 150 has access to the payment processing network server computer 155 and the database 159. The server computer 155 is in communication with database 159, and includes computer readable medium 157, processor 156-1, and comparison module 158.

The user 110 refers to an individual or organization such as a business that is capable of purchasing goods or services or making any suitable payment transaction with the merchant website 130.

The portable consumer device 112 refers to any suitable device that allows the payment transaction to be conducted with the merchant website 130. The portable consumer device 112 may be in any suitable form. For example, suitable portable consumer devices 112 can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices 112 include cellular phones, personal digital assistants (PDAs), pagers, payment cards, security cards, access cards, smart media, transponders, and the like. In some cases, the portable consumer device 112 may be associated with an account of user 110 such as a bank account.

Portable consumer device 112 may include a contactless element 114 that includes a processor (not shown), an antenna (not shown), computer readable media (not shown), and one or more applications stored on the computer readable media that operate in concert to allow the portable consumer device 112 to wirelessly send its stored card data to a wireless reader. The contactless element 114 provides Near Field Communication (NFC) capability for the portable consumer device 112 such that when the portable consumer device 112 is in close proximity of a wireless reader, the wireless reader powers the contactless element 114 and collects the card data.

The mobile device 118 may be in any suitable form. For example, suitable mobile device 118 can be hand-held and compact so that they can fit into a consumer's wallet and/or pocket (e.g., pocket-sized). Some examples of the mobile device 118 include desktop or laptop computers, cellular phones, personal digital assistants (PDAs), pagers, payment cards, security cards, access cards, smart media, transponders, and the like. In some embodiments, the mobile device 118 and the portable consumer device 112 are embodied in the same device.

The user computer 120 may be a personal computer or a laptop. The user computer 120 may run an operating system such as Microsoft Windows™ and may have a suitable browser such as Internet Explorer™.

The verification token 122, also referred to as the "token", is an electronic device configured to be coupled to the user computer 120 and capable of wirelessly receiving card data from the portable consumer device 112. Elements of the verification token 122 and their operation will be described later with reference to FIG. 2.

The merchant website 130 may be in the form of a website hosted by one or more server computers (e.g. server computer 131). The user 110 is capable of communicating with the merchant website 130 using the user computer 120 and/or mobile device 118.

The acquirer 140 refers to any suitable entity that has an account with a merchant associated with the merchant website 130. In some embodiments, the issuer 160 may also be the acquirer 140.

The payment processing network 150 refers to a network of suitable entities that have information related to an account associated with the portable consumer device 112. This information includes data associated with the account on the portable consumer device 112 such as profile information, data, and other suitable information. Such data may be stored in one or more databases such as the database 159 and accessible by one or more server computers such as the payment processing network server computer 155.

The payment processing network 150 may have or operate a server computer and may include a database (e.g. the server computer 155 and the database 159). The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. Server computer may comprises one or more computational apparatuses and may use any of a variety of computing structures, arrangements, and compilations for servicing the requests from one or more client computers.

The payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. The payment processing network 150 may use any suitable wired or wireless network, including the Internet.

The IP Gateway 152 can refers to an entity that includes one or more servers such as IP Gateway server computer 153 which include one or more computer readable media 154 and one or more processors 156-2. The IP Gateway 152 may also include one or more databases 151, and have access to various issuer data, transaction data and user data used to authenticate the portable consumer devices. The IP Gateway 152 also generates and delivers notifications and alert messages to various delivery channels. The IP Gateway 152 may be part of the payment processing network 150 or may be a separate entity in communication with payment processing network 150.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

The databases 151 and 159 may be server computers that are capable of storing data and responding to queries from client computers. The databases 151 and 159 may also be in the form of stand-alone hard drives connected to one or more server computers that retrieve the data from the databases 151 and 159 as result of queries from client computers.

As used herein a "computer readable medium" or "computer readable storage medium" is typically a storage medium such a hard disk or any suitable type of data storage medium capable of storing data such as program codes.

The comparison module 158 can be a program that monitors the stream of data in an electronic payment transaction and compare various types of data in the electronic payment transaction such as the dynamic verification value with the same type of data supplied by the IP Gateway 152 or any other entity to make sure the data that are part of the electronic payment transactions are accurate and are originated from an authorized source.

The detection module 161 can be a program that monitors the authentication request messages from the user communication devices received by the IP Gateway 152 and determines whether the account identifier of the portable consumer device of the user (e.g. portable consumer device 112) is associated with one or more customized linkage rules.

The verification module 162 can be a program that determines if the authentication request message received by a user communication device complies with the customized linkage rules associated with the portable consumer device that may be used for a payment transaction.

The issuer 160 can be any suitable entity that may open and maintain an account associated with the portable consumer device 112 for the user 110. Some examples of issuers may be a bank, a business entity such as a retail store, or a governmental entity. In many cases, the issuer 160 may also issue the portable consumer device 112 associated with the account to the user 110.

Figure 2:
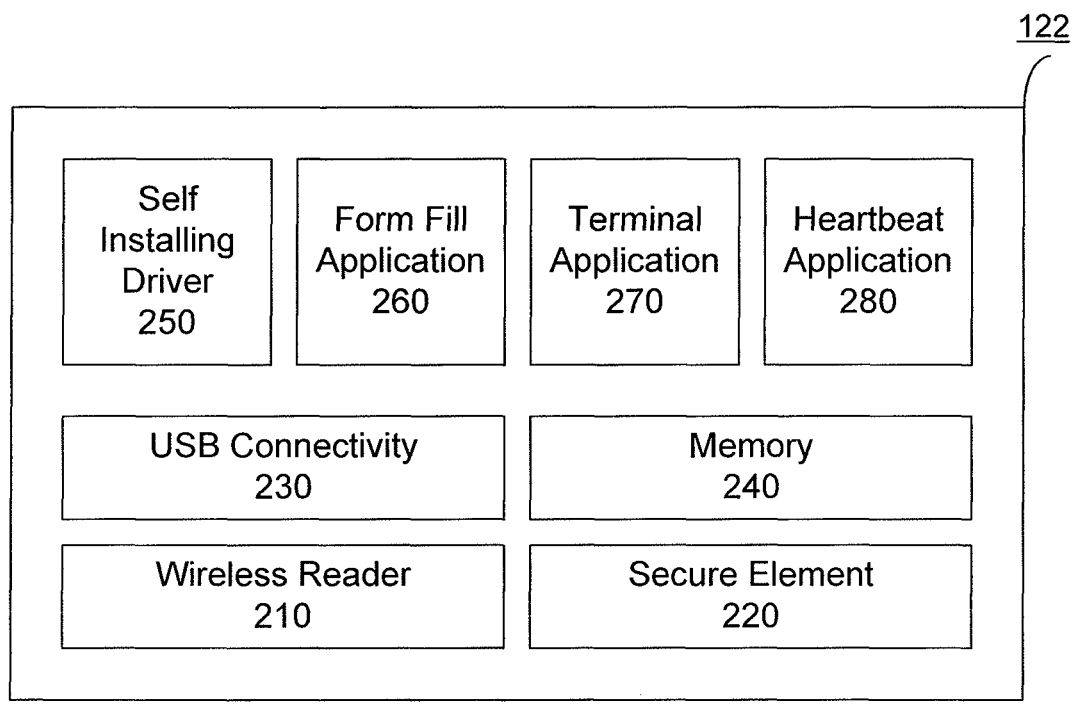
FIG. 2 shows a user communication device according to an embodiment of the invention.

FIG. 2 is a block diagram illustrating various components of the verification token 122 according to one embodiment.

The embodiment illustrated in FIG. 2 is a USB device that includes a USB connectivity module 230, a secure element 220 (e.g., a smart card chip), a wireless/contactless reader 210 capable of reading card data (payment data) from a portable consumer device, a built in memory 240, a self-installing driver 250, a form fill application 260, a terminal application 270, and a heartbeat application 280. The verification token 122 may also have other features such as a keyboard buffer capability and a unique serial number associated with the verification token. The verification token 122 has no footprint on the user computer 120 with internet connectivity when it is plugged in. These various components and modules on the verification token 122 can be used to implement the methods described in more detail below.

Although FIG. 2 illustrates a verification token 122 as something similar to a USB stick, the verification token 122 may come in other forms. For example, it may be piece of hardware or other module installed into a computer, consumer device, or other devices. For example, in other embodiments, the verification token may be housed in a computer and need not be a device that is physically separated from the computer.

II. Method

In the embodiments of the invention, a dynamic verification value may be generated by the server computer 153 in the IP Gateway 152 and delivered to a user communication device such as the verification token 122 and the mobile device 118. The dynamic verification value may be generated in response to a request from a verification token or a user communication device (e.g. mobile device 118) before conducting a payment transaction. When a dynamic verification value is generated, it is sent to the verification token or the user communication device. In some embodiments, the verification token 122, may be utilized in the process of performing an electronic payment transaction (this process will be described in detail below). In some embodiments, a dynamic verification value may be received by a user communication device (e.g. mobile device) and the user 110 may manually enter the dynamic verification value in a payment page of a website.

Before or after sending the dynamic verification value to a verification token or user communication device, the IP Gateway server computer 153 may also send the dynamic verification value to the payment processing network server computer 155 in the payment processing network 150. In one embodiment, the payment processing network 150 may also contact the IP Gateway 152 to receive the dynamic verification value at any time. A processor executing computer code in the payment processing network server computer 155 associates the dynamic verification value with a corresponding account identifier(s) of user 110. The account identifier(s) of the user 110 may be issued by the issuer 160 for which the payment processing network 150 handles the processing and clearing of electronic payment transactions.

When the user 110 purchases goods or services from the merchant website 130 using the user computer 120, the dynamic verification value is entered in the payment page of the merchant website 130 either automatically via the verification token 122 or manually by the user 110.

After it receives transaction details including the payment amount and the dynamic verification value, the merchant website 130 then generates an authorization request message which is sent to the acquirer 140. The acquirer 140 forwards the authorization request message to the payment processing network 150. Upon receipt of the authorization request message, the payment processing network 150 compares the dynamic verification value included in the authorization request message, with the dynamic verification value that was received from the IP Gateway 152 (more specifically, the server computer 153). This is done via the comparison module 158 which runs on the payment processing network server computer 155. In some embodiments, the server computer 155 is part of an authorization system of the payment processing network 150 that utilizes a number of algorithms and employs a number of programs running on computer systems to verify and authenticate an electronic payment transaction.

The payment processing network 150 determines whether the dynamic verification value that was included in the authorization request message matches the copy that was provided by the IP Gateway 152. In one embodiment, the payment processing network 150 then forwards the authorization request message to the issuer 160 along with an indicator that specifies whether there was a match between the dynamic verification values. In one embodiment, if the dynamic verification values do not match, payment processing network 150 may decline the transaction on behalf of the issuer 160. The issuer 160 or the payment processing network 150 can then generate an authorization response message which indicates whether the transaction is approved or declined. The authorization response message is forwarded to the acquirer 140 and then to the merchant 130.

Two specific embodiments in which the user 110 may use a verification token and a user communication device to request and receive a dynamic verification value will now be described. It will be understood by those skilled in the art that other means may be used to request, receive and use the dynamic verification value to conduct an electronic transaction, and that the following descriptions are not indented to be limiting.

Referring to FIG. 1, in an embodiment of the invention, the user 110 may receive a verification token 122 such as the one illustrated in FIG. 2 from his or her financial institution (issuer 160, for example). Alternatively, a user may receive a verification token 122 from another entity on behalf of a financial institution.

The user 110 can then connect the verification token 122 into the USB port of his user computer (user computer 120, for example). The verification token 122 is then powered by the user computer, and it is recognized as a valid device. The verification token 122 can also self-install via the self-installing driver 250 (shown in FIG. 2), and then ping the user computer 120 to check for internet connectivity.

If Internet connectivity is available, the verification token 122 can then automatically attempt to establish a background SSL session to the IP Gateway 152 through a predefined IP address, using the user computer 120, so that it can be used as a part of an authentication process. A terminal application 270 and heartbeat application 280 may be used to establish and maintain this connection. If the session connection is successfully established, the verification token 122 identifies itself to the IP Gateway 152 by providing its unique serial number and/or IP address.

When the user 110 is ready to submit his/her payment information to the merchant website 130, he/she holds the portable consumer device 112 in close proximity of the verification token 122. Card data associated with the portable consumer device 112 are received by the verification token 122 from the contactless element 114 of the portable consumer device 112. The verification token 122 encrypts the card data and sends them to the IP Gateway 152 via the previously established SSL session described above. When the IP Gateway 152 receives the encrypted data, the authenticity of the information is validated by validating the account identifier associated with the portable consumer device 112. The IP Gateway 152 generates a dynamic verification value based on a predetermined algorithm, and sends the dynamic verification value to the verification token 122. The dynamic verification value is automatically form-filled in the payment page of the merchant website 130 by the form-fill application 260 shown in FIG. 2.

When the dynamic verification value is submitted to the merchant website 130, the merchant website 130 then generates an authorization request message which is sent to the acquirer 140. Acquirer 140 passes the authorization request to the payment processing network 150. Payment processing network 150 compares the dynamic verification value that is in the authorization request message from the acquirer 140 (which is received from the merchant website 130) to the dynamic verification value that is received from the IP Gateway 152. This is performed by the comparison module 158. If they match, the payment processing network 150 sends the authorization request message to the issuer 160. The issuer 160 generates an authorization response message which indicates whether the transaction is approved or declined. The authorization response message is sent to the payment processing network 150 which then sends it to the acquirer 140. The acquirer 140 informs the merchant associated with the merchant website 130 about the result.

In another embodiment, the user 110 requests and receives the dynamic verification value using the mobile device 118. The user 110 then initiates a request by sending an SMS from the mobile device 118 to the IP Gateway 152. When the IP Gateway 152 receives the request, the phone number and the account identifier associated with the mobile device 118 are identified. The IP Gateway 152 then validates the account identifier associated with the portable consumer device 112 and phone number of the mobile device 118. The IP Gateway 152 generates a dynamic verification value, based on a predetermined algorithm, which is sent (via SMS) to the mobile device 118. The generated dynamic verification value is also sent to the payment processing network 150. Then, user 110 enters the dynamic verification value at the payment page of the merchant website 130 along with the payment information to purchase goods or services.

To add more security to the above described process, the portable consumer device 112, the verification token 122, the user computer 120, mobile device 118 and a user identifier may be linked together via one or more customized linkage rules specified by the user 110 and/or imposed by the issuer 160 in a variety of combination and under a variety of conditions so that a dynamic verification value is generated when the appropriate combination of elements are involved in requesting a dynamic verification value.

A. Enrollment

In the embodiments of the invention, one or more customized linkage rules may be specified by the user for his portable consumer device. The customized linkage rules may be specified through an enrollment process in which the user specifies that certain combination of a verification token, user communication devices (e.g. user computer 120) and user identifier (e.g. fingerprint, user's voice signature, password, etc.) should be used for submitting an authentication request message and requesting a dynamic verification value and performing a payment transaction.

The user 110 can enroll the account identifier (e.g. primary account number (PAN)) associated with his portable consumer device 112 through a website operated by the issuer 160 or the payment processing network 150. In either case, the specified customized linkage rules may be sent to the server computer 153 in the IP Gateway 152. The customized linkage rules can be saved in a database 151. The customized linkage rules are then associated with the account identifier of the portable consumer device (e.g. portable consumer device 112) of the user.

Figure 3:
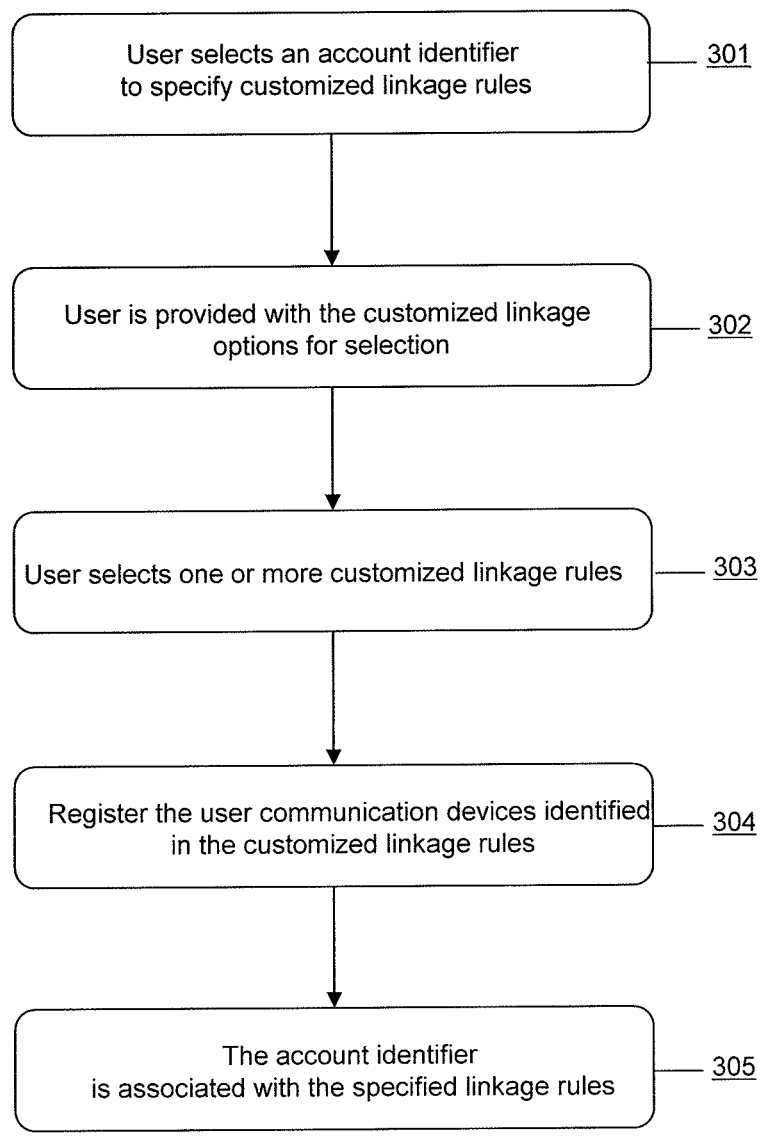
FIG. 3 illustrates a flowchart that shows the steps involved in enrollment process according to an embodiment f the invention.

FIG. 3 shows a flowchart that illustrates the enrollment process. First, the user 110 selects an account identifier associated with his portable consumer device 112 so that he can specify which combination of user communication devices and user identifiers should be present when submitting an authentication request message and requesting a dynamic verification value. This is shown as step 301. As mentioned earlier, this can be performed via a web site hosted by the issuer 160 or the IP Gateway 152. In step 302, user 112 is provided with the available type(s) and combination(s) of the customized linkage options that can be selected to create one or more customized linkage rules.

In step 303 (FIG. 3), the user 110 then creates one or more customized linkage rules for the his portable consumer device 112. The user 110 then registers the verification tokens and user communication devices during the enrollment process (step 304). In some embodiments, the user 110 will be prompted to allow an application running on the IP Gateway server computer 153 or a server computer of the issuer 160 (not shown) to extract a unique device identifier from the user communication devices that the user 110 has identified in the customized linkage rules. The unique device identifiers of the user computer 120 may be the serial number of the CPU or network card of the user computer 120. Mobile device 118 and verification token 122 also may have unique device identifiers associated uniquely with those devices.

Thereafter, in step 305, the portable consumer device 112 is associated with one or more customized linkage rules specified by the user 110. The customized linkage rules can be saved in the database 151. In the embodiments where the issuer 160 receives the customized linkage rules from the user 110, the customized linkage rules can be sent from the issuer 160 to the IP Gateway 152 which may save them into the database 151.

FIG. 4, shows some examples of possible customized linkage rules that may be specified by the user 110 during the enrollment process. Each row in the tables shown in FIG. 4, indicates an example of the elements, that are identified by the user 110 in a customized linkage rule, to be involved in submitting an authentication request message and requesting a dynamic verification value in preparation for performing a payment transaction. As shown in the tables of FIG. 4, these elements are the portable consumer device (e.g., portable consumer device 112), verification token (e.g., verification token 122), user computer (e.g., user computer 120), mobile device (e.g., mobile device 118), and user identifier. Fields that are marked with an "X" indicate that the element that the user 110 has identified in a customized linkage rules. This indicates that the identified elements should be involved in submitting an authentication request message and requesting a dynamic verification value.

In some embodiments, the user 110 may specify that his portable consumer device 112 should be used along with the verification token 122 and/or user computer 120 for requesting a dynamic verification value. In some embodiments, the presence of the portable consumer device 112 may not be required, since the user 110 may remember the account identifier of the portable consumer device 112 and he may manually enter the account identifier into the payment page of a merchant website, for example.

As described earlier, user 110 may use his mobile device 118 to request for a dynamic verification value and perform a payment transactions. Therefore, the user 110 may also specify customized linkage rules that involve the mobile device 118. Some examples of such customized linkage rules are shown in Table B in FIG. 4. The mobile device 118 may be retrofitted with a verification token or may be adapted to be coupled with a verification token and to perform a payment transaction.

Tables A and B in FIG. 4 illustrate some exemplary customized linkage rules. Customized linkage rule 401A indicates that the portable consumer device, verification token, user computer and a user identifier are tied together. Therefore, if the user wishes to perform a payment transaction, he needs to use his portable consumer device with the specified verification token and the user computer and provide a user identifier in order to receive a dynamic verification value. Customized linkage rule 401B is similar to 401A except in 401B a mobile device is tied to the portable consumer device, verification token and the user identifier.

Customized linkage rule 402A indicates that the portable consumer device is tied to the verification token and the user computer. Customized linkage rule 402B indicates that the portable consumer device is tied to the verification token and the mobile device. In this example, verification token is capable of being connected to the mobile device.

Customized linkage rule 403A indicates that the portable consumer device is tied with the verification token. Customized linkage rule 404A indicates that the portable consumer device is tied to the user computer, and the customized linkage rule 404B indicates that the portable consumer device is tied to the mobile device. Customized linkage rules 405A and 405B are similar to customized linkage rules 404A and 404B respectively, but in addition a user identifier should also be used for requesting a dynamic verification value.

Customized linkage rule 406A indicates that the verification token, the user computer and a user identifier are tied together. Customized linkage rule 406B indicates that the verification token, the mobile device and a user identifier are tied together. Therefore, the user can use any of his portable consumer devices (e.g. credit cards) with these combination of elements to perform a payment transaction. Customized linkage rules 407A and 407B are similar to rules 406A and 406B except that a user identifier is not required.

The user identifier may be an identifier that is unique to the user 110, as mentioned earlier, the user identifier may be in the form of biometric characteristics of the user 110 such as voice signature or fingerprint. It may also be a password. The types of user identifiers utilized, may depend on the ability of the user communication devices and the verification token to support that technology. For example, if the verification token 122 or the user computer 120 are retrofitted with a fingerprint scanner, then the user has the ability to select the fingerprint as his user identifier.

In some embodiment, if the user 110 wishes to use his voice signature as the user identifier, the user 110 may be prompted to record his voice at the time of enrollment so that an audio file can be generated which represents the voice signature of the user 110. Thereafter, when an authentication request message and a request for a dynamic verification value is received, the user 110 will be prompted to provide a sample voice signature, by reading a sentence or speaking a word, that will be used by the IP Gateway 152 to compare with the user's audio file saved by the IP Gateway 152, (i.e. recorded at the time of enrollment) to determine whether the user voice matches with the audio file recorded during the enrollment process.

In one embodiment, during the enrollment process, a sentence or a word is spoken by the user 110 and recorded by a server computer (e.g. IP Gateway server computer 153) that hosts the enrollment website. In another embodiment, the user 110 may be provided with a phone number where he can call via his mobile device 118 and record his voice. Thereafter, when an authentication request message and a request for a dynamic verification value is received, via his mobile device 118 for example, the user 110 is prompted to submit his user identifier which in this example is his voice signature.

Figure 5:
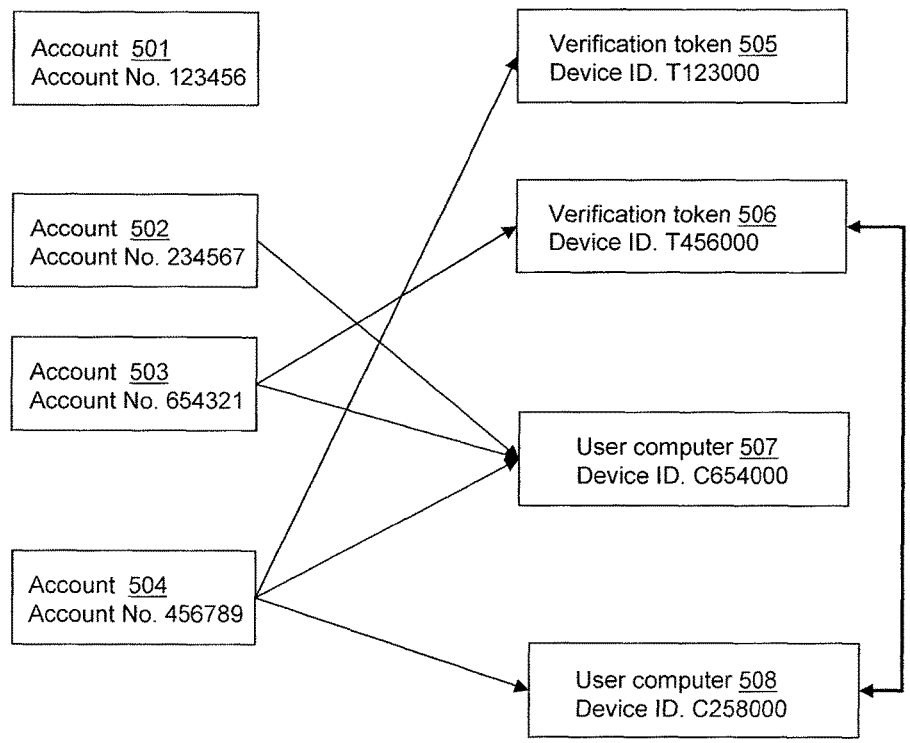
FIG. 5 shows some examples of customized linkage rules according to an embodiment of the invention.

FIG. 5, illustrate some examples of customized linkage rules that may be specified by the user 110 for his portable consumer devices. As shown in FIG. 5, the user 110 may have four portable consumer devices each of which is associated with an account identifier. Exemplary account identifiers associated with the portable consumer devices are shown in FIG. 5 for accounts, 501, 502, 503, and 504. In the examples, shown in FIG. 5, the user 110 is in possession of two verification tokens 505 and 506, as well as two user computers 507 and 508.

In the examples shown in FIG. 5, the user 110 chooses not to specify any customized linkage rules for the account 501. Therefore, the user 110 is able to resume using the portable consumer device associated with the account 501 without having to use any particular verification token and user computer to perform payment transactions. As shown in Table A in FIG. 5, a customized linkage rule is set by the user 110 so that account 502 is linked with the user computer 507. Therefore, whenever the user 110 wishes to request for a dynamic verification value, the request should be made with user computer 507. In this specific example, the user 110 may use any verification token for requesting a dynamic verification value as long as that verification token is used with the user computer 507.

In another example shown in FIG. 5, a customized linkage rule is set so that account 503 is linked with the verification token 506 and user computer 507. However, it is specified that the user computer 507 is required for requesting a dynamic verification value if the amount of purchase is greater than $500.00. Therefore, in this specific example, when the user 110 uses a portable consumer device associated with the account 504, verification token 506 should be used for requesting a dynamic verification value. In addition, if the purchase amount is greater than $500.00, then user computer 507 must be used with the verification token 506 for requesting the dynamic verification value. This may advantageously allow the user 110 to perform the payment transactions that involve higher amounts with more security.

In yet anther example shown in FIG. 5, a customized linkage rule is specified so that account 504 is linked with verification token 505 and user computers 507 and 508. In this specific example, a dynamic verification value can be requested for account 504 as long as the verification token 505 and any on one of the user computers 507 or 508 are used.

Table B in FIG. 5 shows another customized linkage rule that does not involve any particular portable consumer device and account identifier. In some embodiments, the user 110 may have a verification token that may be used with many different types of portable consumer devices that may be used to perform payment transactions across multiple payment processing networks. In this specific example, the user 110 links the verification token 506 with the user computer 508. Therefore, regardless of which portable consumer device is used, a dynamic verification value may be requested as long as the verification token 506 is connected with the user computer 508.

In some embodiments, the account identifier of the portable consumer devices and the device identification of the verification token, and the user communication devices are used to check the customized linkage rules. As described before, the IP Gateway 152 can save a unique device identification of user communication devices (e.g. user computer and mobile device) and verification tokens in addition to an account identifier associated with the portable consumer device in the database 151. In one example, the IP Gateway 152 can obtain the device identification of the use communication devices that are used in the process of requesting a dynamic verification value and compare the device identification of the user communication devices with the ones saved in the database 151 to determine whether the verification token and the user communication device devices are authentic.

FIG. 5 illustrates exemplary account identifier for accounts 501-504 and exemplary device identification for verification tokens 505 and 506 and user computers 507 and 508. In some embodiments, the device identification of the user computer may be a serial number associated with the CPU. The device identifier of the verification tokens and the user computer may be in any suitable format (i.e. numeric or alphanumeric) and may be in any length.

B. Requesting and Generating a Dynamic Verification Value

Having described the enrollment process, the process of requesting and generating a dynamic verification value will now be described with reference to the figures.

Figure 6:
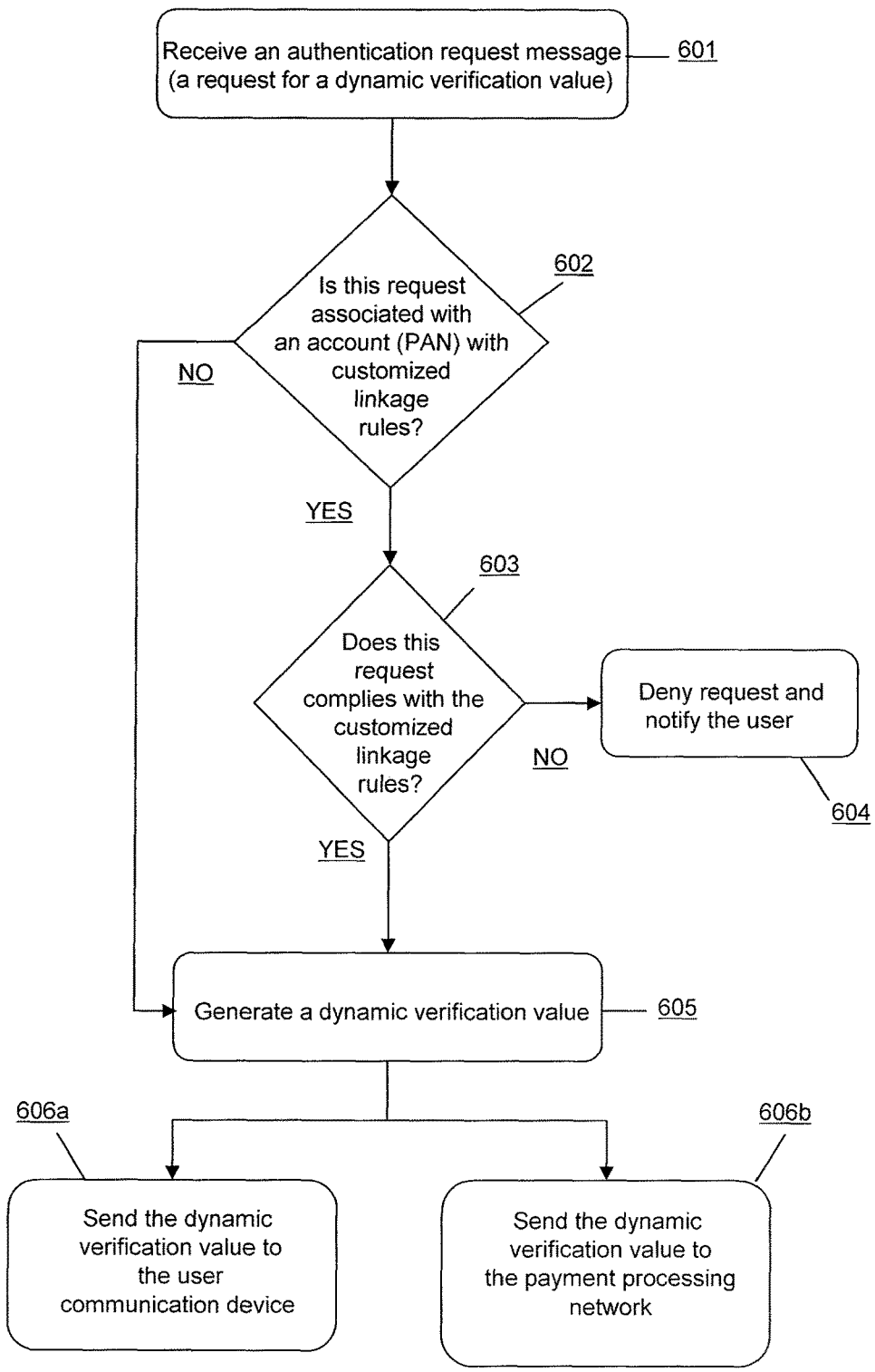
FIG. 6 illustrates a flowchart that illustrates the steps involved in checking the customized linkage rules and generating a dynamic verification value according to an embodiment of the invention.

FIG. 6 illustrates a flowchart that shows the process involved in receiving an authentication request message and a request for a dynamic verification value at the IP Gateway 152, and generating a dynamic verification value. As shown in the flowchart of FIG. 6, in step 601 the IP Gateway server computer 153 in the IP Gateway 152 receives an authentication request message which can be a request for a dynamic verification value. In step 602, the detection module 161 which may be embodied as a program stored on the computer readable medium (CRM) 154 that is being run by the processor 156-2, checks to see if the incoming request is associated with an account identifier that has customized linkage rules (step 602). As described earlier, in the enrollment process the account identifier of the portable consumer device of the user 110 (e.g. portable consumer device 112) is associated with one or more customized linkage rules specified by the user 110. The customized linkage rules may then be saved in the database 151. The detection module 161 can search the database 151 to determine whether the account identifier of the portable consumer device that was received as part of the data in the authentication request message is associated with any customized linkage rules.

If the detection module 161 determines that the authentication request message is associated with an account identifier with customized linkage rules, then in step 603 the verification module 162 can determine whether the authentication request message complies with the specified customized linkage rules. Similar to the detection module 161, the verification module 162 may be embodied as a program stored on the computer readable medium (CRM) 154 and run by the processor 156-2.

As described earlier, the unique device identifiers of the user communication devices such the verification token 122, user computer 120 and mobile device 118 that are identified by the user 110 to be part of the customized linkage rules are obtained during the enrollment process. The authentication request message can include the unique device identifiers of the user communication devices and/or verification tokens that are being used to generate and submit the authentication request message. The verification module 162 then analyses the authentication request message to determine whether the user and/or the user communication devices being used are authentic. In this analysis, the verification module 162 may compare the unique device identifiers of the user communication devices and verification tokens identified in the authentication request message with the unique device identifiers associated with the account identifier in the database 151.

For example, referring to FIG. 1, if a request is received from the user computer 120, and if the verification token 122 was also used by the user 110 to extract and send the data of the portable consumer device 112, then the verification module 162 checks the customized linkage rule to determine the types of the user communication devices that must be used in an authentication request message. If the customized linkage rules indicates that both the user computer and the verification token must be used for the request, then the verification module 162 compares the unique device identifiers of the user computer 120 and the verification token 122 with the ones saved in the database 151 to determine if they are the same devices that were identified by the user 110 during the enrollment process.

Also, if the customized linkage rules involve the use of user identifiers such as voice signature, fingerprint of the user, password, etc. then the verification module 162 prompts the user to provide such user identifiers.

In some embodiments, the issuer 160 may impose a linkage rule for an account identifier associated with the portable consumer device 112. The linkage rules specified by the issuer 160 can also be saved in the database 151. In such embodiments, the verification module 162 can check the authentication request message to determine if it complies with the issuer specific linkage rules.

If the request does not comply with the customized linkage rules (i.e. the combination and/or types of devices used are not the same as specified in the customized linkage rules), then in step 604, the IP Gateway 152 denies the request and may notify the user 110 that a dynamic verification value will not be generated.

If the request does comply with the customized linkage rules, then in step 605, the IP Gateway 152 generates a dynamic verification value. In step 606a the dynamic verification value is sent to the verification token 122 and in step 606b the dynamic verification value is send to the payment processing network 150.

Thereafter, as described earlier, the dynamic verification value is automatically form-filled in the payment page of the merchant website 130 by the form-fill application 260 shown in FIG. 2. The merchant website then generates an authorization request message that will be sent to the acquirer 140. Acquirer 140 then forwards the authorization request message to the payment processing network 150. At this point, the comparison module 158 compares the dynamic verification value that was part of the authorization request message with the dynamic verification value that was received from the IP Gateway 152. If the dynamic verification values match, the payment processing network 150 forwards the authorization request message to the issuer 160.

In some embodiments, if the customized linkage rules involves limit on the purchase amount such as the example shown in FIG. 5 where the user computer 507 should be used for purchases of more than $500.00, then the IP Gateway 152 may indicate to the payment processing network 150 that once the authorization request message arrives with the purchase price, the customized linkage rules should be once again visited by the verification module 162 to determine whether the final purchase price violates the specified customized linkage rule. If the customized linkage rule is violated, then the payment processing network may decline the transaction.

In some embodiments, the payment processing network 150 may provide a list of user communication devices such a user computers that were involved in fraudulent transactions and therefore should be blacklisted. The IP Gateway 152 can store the unique device identifiers of such user communication devices and verification tokens in the database 151 so that for each request for a dynamic verification value the list of unauthorized user communication devices (also referred to as the blacklist) is checked to see if the request is coming from a device that has been blacklisted by the payment processing network 150 and a dynamic verification value should not be generated.

In one example, a fraudster may use a stolen verification token with a user computer in a public library in an attempt to perform a fraudulent payment transaction. Upon discovering that the verification token was involved in a fraudulent transaction, the verification token may be blacklisted and future authentication requests from that verification token may be denied. In addition, if it is determined that a user computer in a public library is also being frequently used by fraudsters to perform fraudulent payment transactions, then the user computer may also be blacklisted.

It can be appreciate that the embodiments of this novel invention provide many advantages. The ability to establish customized linkage rules provides a great level of security for payment transactions. The embodiments of the invention can substantially reduce the occurrence of unauthorized and fraudulent transactions. When a customized linkage rule indicates that a request for a dynamic verification value should come from a personal computer of the user, then even if a fraudster can find the personal information of the user, he cannot perform a payment transaction.

Figure 7:
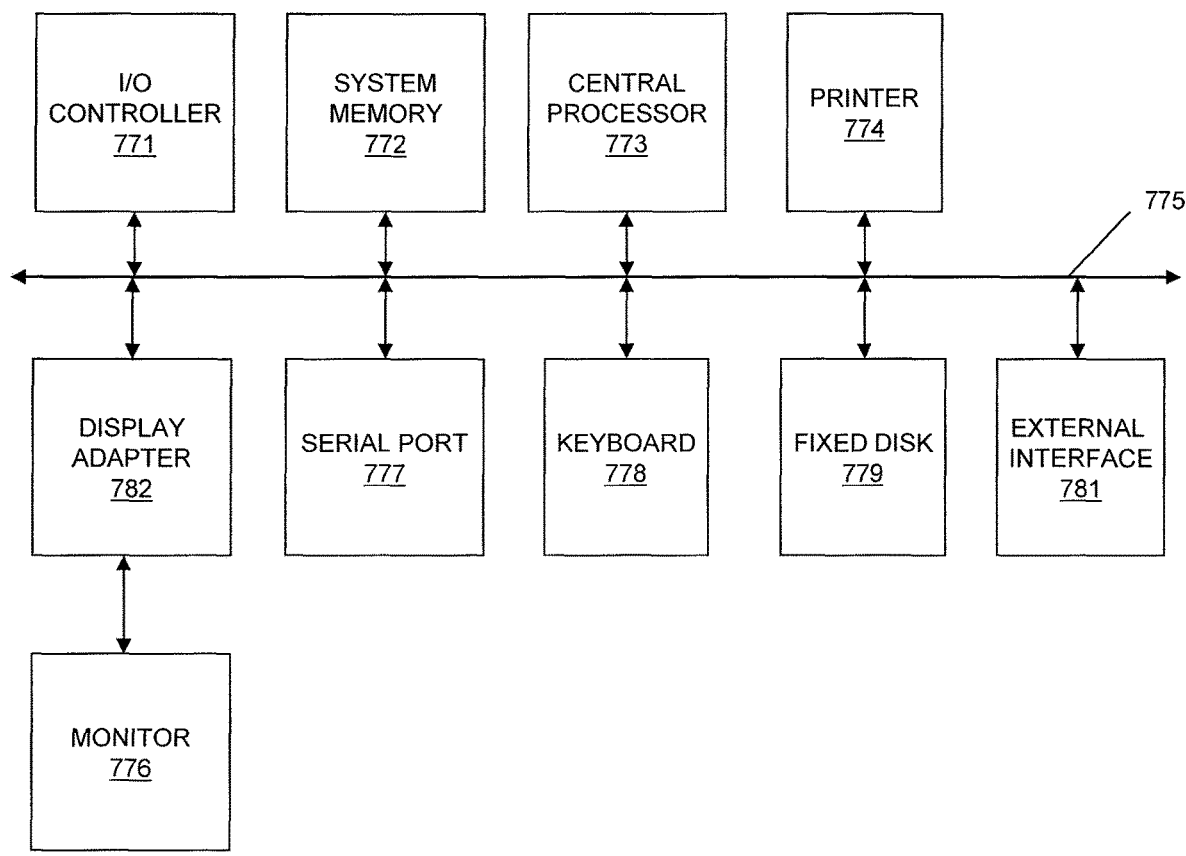
FIG. 7 shows a system according to an embodiment of the invention.

The various participants and elements of the system shown in FIG. 1 may operate one or more computer apparatuses to facilitate the functions described herein. Any of the elements in FIG. 1 may use any suitable number of subsystems to facilitate the functions described herein. Examples of such subsystems or components are shown in FIG. 7. The subsystems shown in FIG. 7 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Embodiments of the present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
    receiving, by a computer, an authentication request message for a payment transaction on a payment account, the authentication request message received from a user communication device, the authentication request message comprising (1) a verification token identifier that identifies a verification token device, (2) a user communication device identifier that identifies the user communication device, and (3) an account identifier that identifies the payment account for conducting the payment transaction, the computer storing a linkage rule linking (1) the verification token device, (2) the user communication device, and (3) the payment account;
    identifying, by the computer the linkage rule based on the account identifier included in the authentication request message;
    authenticating, by the computer, the payment transaction using the identified linkage rule by verifying that the verification token identifier that identifies the verification token device and the user communication device identifier that identifies the user communication device;
    in response to the authenticating of the payment transaction using the identified linkage rule, generating, by the computer, a dynamic value based at least in part on the account identifier;
    providing, by the computer, the dynamic value to either (1) the verification token device used to conduct the payment transaction or (2) the user communication device used to conduct the payment transaction, wherein either the verification token device or the user communication device provides the dynamic value to a merchant computer to conduct the payment transaction on the payment account; and
    receiving, by the computer, an authorization request message from the merchant computer, the authorization request message comprising the dynamic value; and
    sending, by the computer, an authorization response message indicating whether the payment transaction is approved or declined to the merchant computer based on verification of the dynamic value.

2. The method of claim 1, further comprising:
    prompting a user to provide a user identifier, using a verification module stored in the computer, based on a determination that the linkage rule indicates that the user identifier is required from the user; and
    linking, using the linkage rule, the user identifier with the payment account, the verification token device, and the user communication device.

3. The method of claim 2, wherein the user identifier includes any one of a voice signature of the user, a fingerprint of the user, or a password.

4. The method of claim 1, further comprising:
    sending the dynamic value to a second server computer in communication with a payment processing network.

5. The method of claim 1, wherein the user communication device identifier is a serial number of a component of the user communication device.

6. The method of claim 1, wherein the verification token device is configured to wirelessly receive card data from a portable consumer device.

7. The method of claim 1, wherein the verification token device is adapted to encrypt card data and send it to the computer.

8. The method of claim 1, wherein a user specifies a combination of the user communication device identifier and a user identifier to be used when sending the authentication request message.

9. The method of claim 1, wherein the linkage rule is selected from a set of linkage rules that are adapted to link the account identifier with a plurality of user communication devices.

10. The method of claim 1, wherein the linkage rule is selected from a set of linkage rules that are adapted to link the user communication device with a plurality of account identifiers.

11. A system comprising:
    a processor; and
    a computer readable medium, the computer readable medium comprising code, executable by the processor, for implementing a method comprising receiving an authentication request message for a payment transaction on a payment account, the authentication request message received from a user communication device, the authentication request message comprising (1) a verification token identifier that identifies a verification token device, (2) a user communication device identifier that identifies the user communication device, and (3) an account identifier that identifies the payment account for conducting the payment transaction, the system storing a linkage rule linking (1) the verification token device, (2) the user communication device, and (3) the payment account;
    identifying the linkage rule based on the account identifier included in the authentication request message;
    authenticating the payment transaction using the identified linkage rule by verifying that the verification token identifier that identifies the verification token device and the user communication device identifier that identifies the user communication device;

in response to the authenticating of the payment transaction using the identified linkage rule, generating a dynamic value based at least in part on the account identifier;

providing the dynamic value to either (1) the verification token device used to conduct the payment transaction or (2) the user communication device used to conduct the payment transaction, wherein either the verification token device or the user communication device provides the dynamic value to a merchant computer to conduct the payment transaction on the payment account; and receiving an authorization request message from the merchant computer, the authorization request message comprising the dynamic value; and sending an authorization response message indicating whether the payment transaction is approved or declined to the merchant computer based on verification of the dynamic value.

12. The system of claim 11, wherein the user communication device identifier is a serial number of a component of the user communication device, and wherein the serial number identifies a CPU or network card of the user communication device used to conduct the payment transaction.

13. The system of claim 11, wherein the verification token device encrypts the account identifier received from a portable consumer device, and wherein the account identifier of the authentication request message is the account identifier encrypted by the verification token device.

14. The system of claim 11, wherein the verification token device is configured to wirelessly receive card data from a portable consumer device.

15. The system of claim 11, further comprising the user communication device.

16. The system of claim 11, further comprising the verification token device.

17. The system of claim 11, wherein the linkage rule is selected from a set of linkage rules that are adapted to link the account identifier with a plurality of user communication devices.

18. The system of claim 11, wherein the linkage rule is selected from a set of linkage rules that are adapted to link the user communication device with a plurality of account identifiers.

19. The system of claim 11, wherein the authorization request message comprises an ISO 8583 message.

20. The system of claim 11, wherein the authorization request message comprises an amount and the account identifier.

* * * * *